United States Patent Office 2,843,578
Patented July 15, 1958

2,843,578

THERMOPLASTIC CONDENSATION PRODUCT OF BENZYLATED WOOD WITH ACETOPHENONE AND METHOD OF PREPARING SAME

Walter Eduard Asmus Simon, Kiel-Wellingdorf, Germany, assignor of one-half to Bernard E. Smith, New York, N. Y.

No Drawing. Application November 12, 1953
Serial No. 391,749

2 Claims. (Cl. 260—124)

The production of cellulose ethers has been known in practice for a long time. It is also known that a mixture of lignin and cellulose, as occurring in wood can also be converted into the respective ethers. The ethers from wood are, however, of less quality than those obtained from pure cellulose. The reason for this difference in quality is that all kinds of wood, as is well known, contain varying amounts of lignin and that practically two etherifications take place, namely, that of the cellulose and that of the lignin and that in these etherified substances the cellulose and the one half of the lignin molecule participate in the etherifying, whereas the other half of the lignin molecule cannot take part in the etherifying because no hydroxyls are available in this group of molecule. It is known that lignin, or originating for example from the wood saccharification, can be etherified, that is the etherifiable half of the molecule. The obtained product is, however, a thermoplastic mass with poor physical properties, which needs large amounts of plasticizer to be usable in practice to any extent. As already mentioned the disturbing complex in this mass is the unetherifiable molecule group of the lignin.

The subject of this patent application is the transformation of the lignin contained in combination with the cellulose to a usable plastic mass after the etherification. The lignin part thus transformed can serve to plasticize the whole mass, for example by conversion into a plasticizer by means of condensation to a soft resin, and as the plasticizer covers the molecule intimately, the same can only be separated if the molecule is also destroyed. This latter process can start only under abnormal conditions as, for example, great heating action or chemical influences. This physical improvement is attained in that the remaining groups in the lignin molecule are converted by condensation with suitable condensation media as, for example, ketones, for example acetophenone or cyclo-hexanones, aldehydes, for example, acetaldehyde, formaldehyde, benzaldehyde or croton aldehyde, resin builders (substances which can be condensed to form resins) as, for example, resorcin, aniline, phenols, p-toluol-sulphonamide or phenol sulphonic acids. The quantity of aldehyde may be about one third of the weight of the dry ether.

The process according to the invention may be carried out as follows: Wood is transformed into benzyl-wood according to a known method, in which first the alkali derivatives of the wood constituents are formed and afterwards an etherification takes place, for example with benzyl chloride. After all the by-products are removed by washing, the obtained mass is dried. The end of the washing process is recognised by the complete solubility of the product in dioxane. The dry mass is now subjected to a condensation with a suitable compound, for example with a ketone, such as aceto-phenone, until it is ascertained that the condensation of the free groups has taken place. This is ascertained by the total solubility in cyclo-hexanone or another suitable ketone, for example acetone. The obtained product is now freed from the excess of the ketone, washed with water and dried. The condensation product thus obtained from the lignin constituent of the etherified wood plasticises the whole compound.

The following method for the production of such a condensation product has proved valuable in practice.

150 g. acetophenone, as well as 10 ccm. of concentrated hydrochloric acid (or other acid) as catalyst are added to 450 g. of benzylated wood calculated as dry substance. The mass is now condensed at a temperature of about 200° C. for about 4 hours in reflux condenser. After the condensation the obtained product is precipitated in petroleum ether or other non-solvent. In this way the acetophenone still resulting from the condensation is removed. The final product is washed with an aqueous solution of alcohol and then dried. The obtained product is of dark colour and if one wishes to use light products must be dissolved in a solvent, for example acetic ester and again precipitated in petroleum ether. Such light products may be used in the varnish industry. The dark and the light product, by reason of its permaanently thermoplastic properties, can be used where temperatures with stresses above 250° C. prevail.

I claim:

1. A process for the production of a plastic mass comprising heating benzylated wood with acetophenone at reflux temperature in the presence of an acid catalyst until the product is soluble in cyclohexanone, and then separating the obtained condensation product by precipitation from unreacted acetophenone.

2. As a new composition of matter, the thermoplastic condensation product of benzylated wood with acetophenone.

References Cited in the file of this patent

UNITED STATES PATENTS 2,635,968    Hallonquist _____ Apr. 21, 1953

FOREIGN PATENTS 1,012,791    France _____ July 17, 1952